United States Patent [19]

Dutt et al.

[11] Patent Number: 4,526,282

[45] Date of Patent: Jul. 2, 1985

[54] TAMPER PROOF CLOSURE CAP, METHOD, AND TOOL FOR MAKING SAME

[75] Inventors: Herbert V. Dutt; Paul A. Santostasi, both of Sarasota, Fla.

[73] Assignee: Sun Coast Plastics, Inc., Sarasota, Fla.

[21] Appl. No.: 567,077

[22] Filed: Jan. 5, 1984

Related U.S. Application Data

[63] Continuation of Ser. No. 491,673, May 5, 1983, abandoned.

[51] Int. Cl.³ .............................................. B65D 41/34
[52] U.S. Cl. ................................................... 215/252
[58] Field of Search ........................................ 215/252

[56] References Cited

U.S. PATENT DOCUMENTS

| | | |
|---|---|---|
| 2,162,711 | 6/1936 | Hamberger . |
| 2,162,712 | 6/1939 | Hamberger . |
| 3,142,402 | 7/1964 | Fox . |
| 3,325,576 | 6/1967 | Kessler . |
| 3,329,295 | 7/1967 | Fields ................................. 215/252 |
| 3,441,161 | 4/1969 | Van Baarn . |
| 3,673,761 | 7/1972 | Leitz . |
| 3,720,343 | 3/1973 | Irish, Jr. . |
| 3,784,041 | 1/1974 | Birch ............................ 215/DIG. 1 |
| 3,929,246 | 12/1975 | Leitz ................................. 215/252 |
| 4,033,472 | 7/1977 | Aichinger ......................... 215/256 |
| 4,075,820 | 2/1978 | Standley . |
| 4,143,785 | 3/1979 | Ferrell .............................. 215/270 |
| 4,231,486 | 11/1980 | Bock ............................. 215/250 X |
| 4,308,965 | 1/1982 | Dutt .................................. 215/345 |
| 4,343,408 | 8/1982 | Csaszar ....................... 215/252 X |
| 4,343,754 | 8/1982 | Wilde et al. ..................... 264/154 |
| 4,346,811 | 8/1982 | Hilaire ............................... 215/252 |
| 4,352,436 | 10/1982 | Chartier et al. .................. 215/252 |

*Primary Examiner*—Donald F. Norton
*Attorney, Agent, or Firm*—Jones Tullar & Cooper

[57] ABSTRACT

A tamper proof closure cap for a container, a tool for manufacturing the cap and a method for removing the cap from the tool are defined. The cap is designed with the tamper proof skirt as a unitary structure with the main body of the cap. The skirt has unique structural aspects which allow for less complexity in the tool and ease of removal of the cap from the tool. The tool includes a stripper ring which laterally support the skirt and permits a shift of the pivot plane for the skirt relative to the main body portion during removal of the cap from the mold.

3 Claims, 7 Drawing Figures

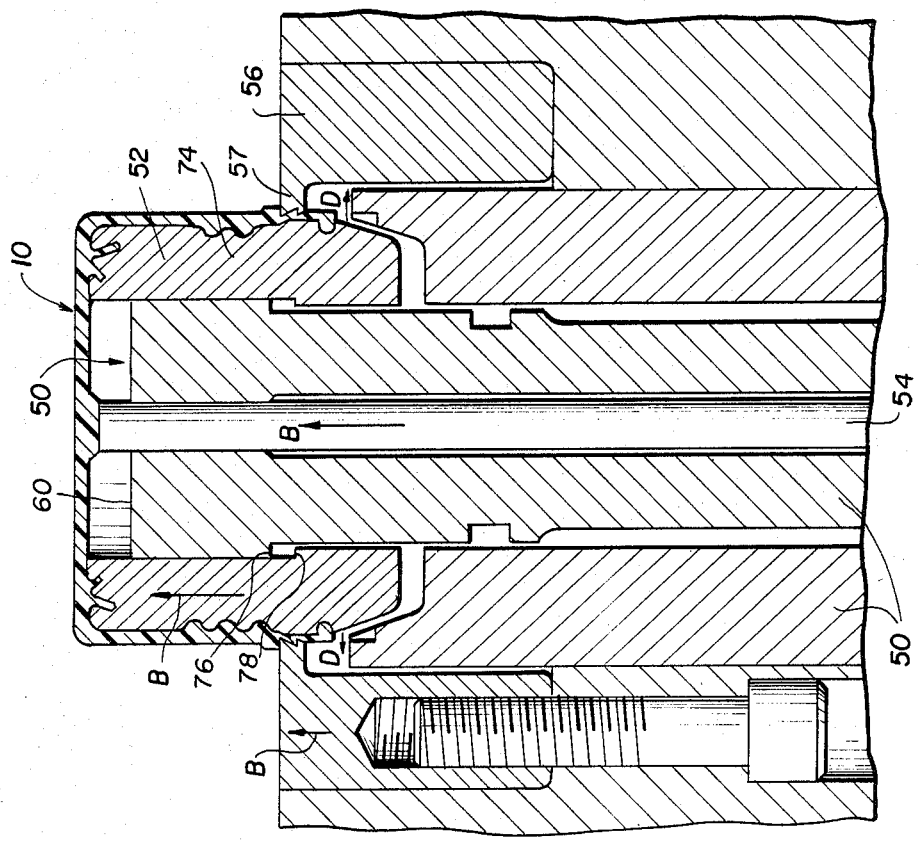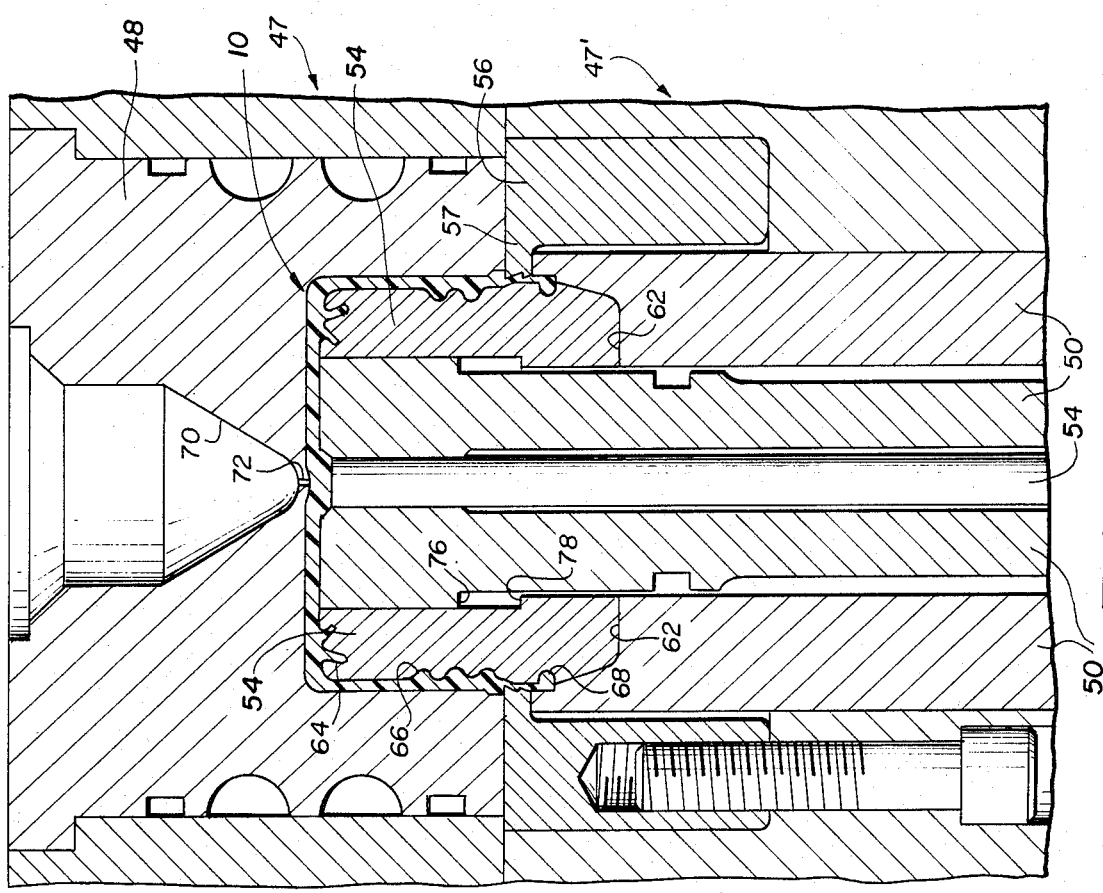

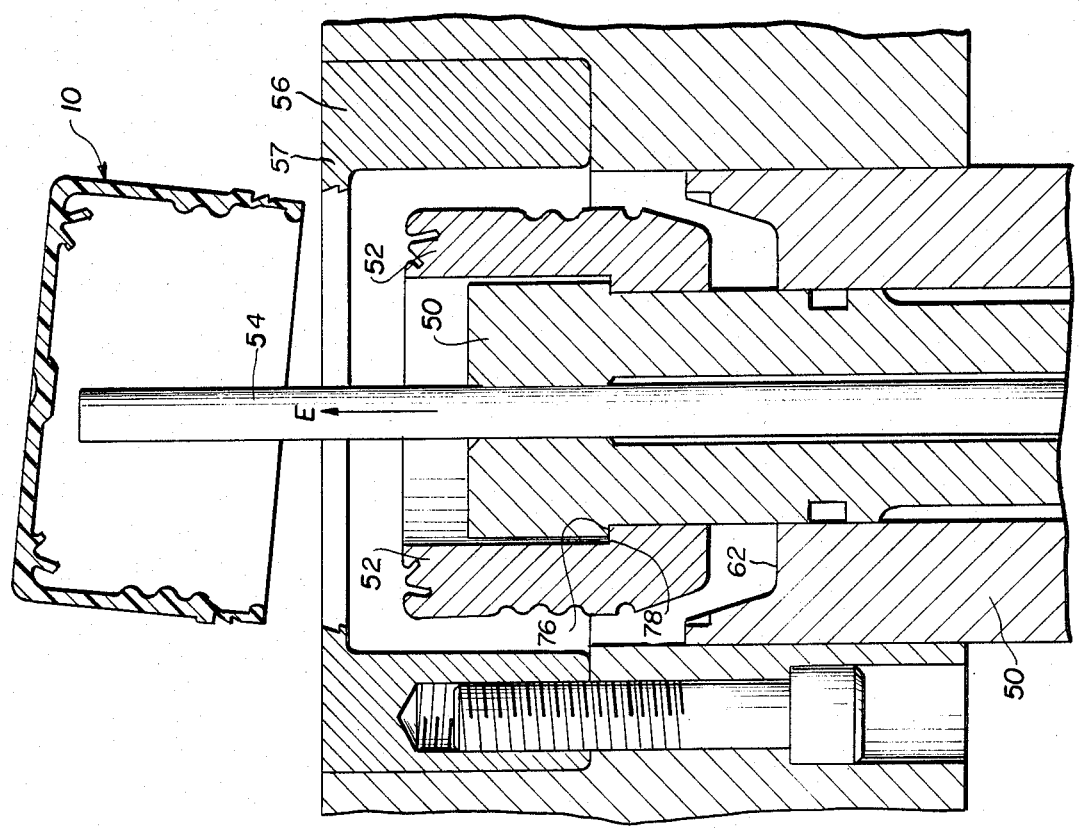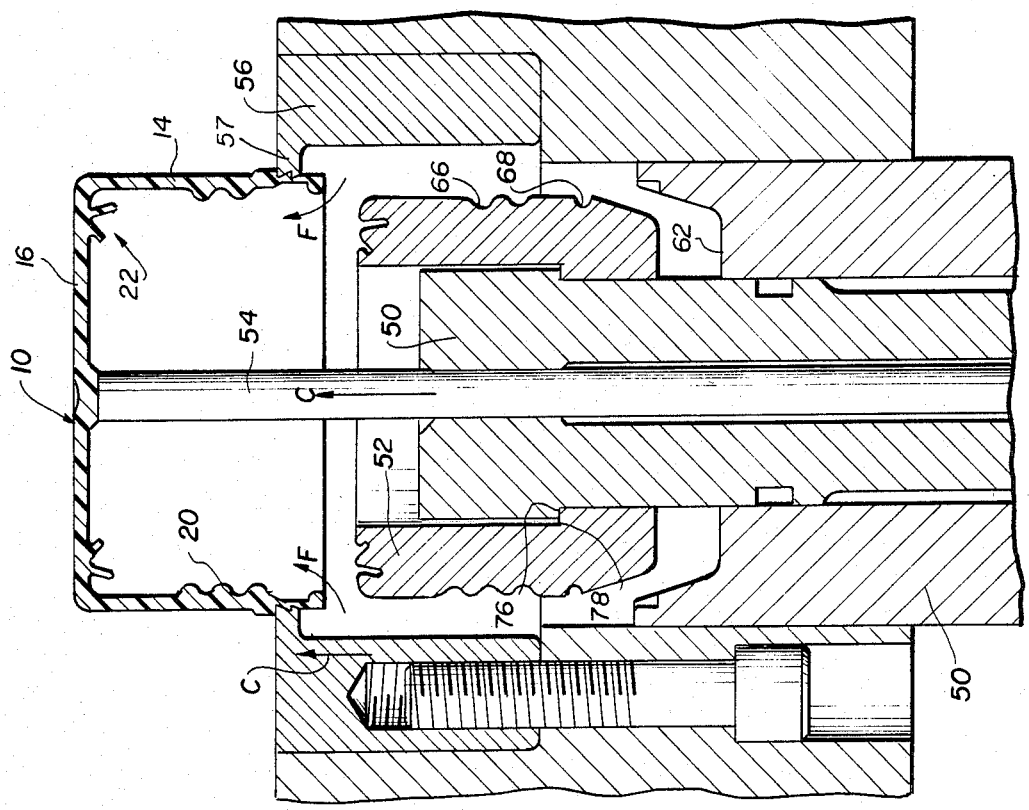

TAMPER PROOF CLOSURE CAP, METHOD, AND TOOL FOR MAKING SAME

CROSS REFERENCE TO RELATED APPLICATIONS

This is a continuation of abandoned co-pending application Ser. No. 491,673, filed May 5, 1983 and assigned to the assignee of the present application.

FIELD OF THE INVENTION

The present invention relates to tamper proof closure caps, which are sometimes referred to as tamper-evident type caps, and to a tool in the form of a mold for making such a cap. More particularly, the invention relates to a novel unitary cap which includes a skirt which is designed to serve a tamper proof function and to a molding tool which is designed to facilitate formation of the cap and attached tamper proof skirt and which includes a mechanism for removing the cap from the mold simply, quickly and effectively without damage to the tamper proof skirt.

PRIOR ART

Tamper proof closure caps for containers are known in the art, and are increasingly in demand for a wide variety of applications. Examples of such caps are found in the following U.S. Pat. Nos.: 2,162,711; 2,162,712; 3,441,161; 3,673,761; 3,720,343; 3,812,911; 3,929,246; 4,033,472; and 4,343,408.

A recurring problem in the production of tamper proof closure caps is the difficulty in making such a device sufficiently strong that it can be removed from a mold intact and remain intact during handling, shipment, and application to a container, yet sufficiently weakened where the tamper proof skirt portion is attached to the cap itself that the skirt will tear away from the cap whenever the cap is removed from its container. This difficulty has led to a wide variety of cap designs, has led to a variety of techniques for applying the caps to the container so as to compensate for design flaws dictated by manufacturing considerations, and has led to the design of complex mold configurations. These difficulties have adversely affected the cost of manufacturing such caps, particularly when they are made of plastic or other synthetic materials. Thus, the prior art discloses caps which must be cut and heated after the molding step. The cutting is necessary to produce a weakened area between the cap and a depending security ring, and the heating is necessary to deform the security ring onto the container being capped. Other patents disclose closure caps wherein the lower security ring is connected to the upper cap portion in such a way that the inside diameter of the security ring is equal to the outside diameter of the cap. This is done to facilitate the removal of the device from the mold, but serves to increase the size of the mold and further requires a deforming step after the cap is placed on a container to insure that the security ring engages the container. Other patents disclose a closure cap which is designed with an annular v-shaped groove which provides a weakened area for allowing the security ring to break away from the cap. However, the molding of such a cap requires a tool having complex cams and angle pins which increase the complexity and thus the cost of the mold. All of these factors adversely affect the cost of manufacturing and applying closure caps with tamper proof rings, or skirts.

Because manufacturing techniques impose restrictions on the shape of a cap, it would be desirable to provide a tamper proof closure cap design which is more cost effective from a manufacturing standpoint. This would involve a cap design which would be easy to apply to a container and would be effective to provide evidence of cap removal while at the same time would permit a tool design which would be relatively simple and inexpensive, yet would permit reliable manufacture of the cap. It would further be desirable to provide a closure cap designed for easy application to a container so as to avoid the heat shrinking methods which have been used in the prior art. Preferably, such a cap would merely be pressed onto the container or threaded on and the tamper proof skirt portion would "snap over" a corresponding bead on the container finish without damaging the cap. This has not been possible with prior cap designs, since the expansion of the skirt portion necessary to allow it to fit over a finish bead would either fracture the skirt or cause it to stretch and thus require heating to return it to its initial size. It would, therefore, be desirable to have a tamper proof closure cap having the capability of fitting over a finish bead to provide the desired security but not the need for additional steps and without the danger of fracture.

OBJECTS AND SUMMARY OF THE INVENTION

It is an object of the present invention to provide an improved tamper proof closure cap.

A related object of the present invention is to provide an improved tamper proof closure cap of unitary construction.

A further object of the present invention is to provide a tamper proof closure cap which includes a deformable skirt portion which can be stretched to accommodate the container being closed without damage to the skirt portion and without requiring a subsequent heat-shrinking step.

Another object of the present invention is to provide an improved tool for fabricating the closure cap of the invention.

A related object of the present invention is to provide an improved method of forming closure caps and an improved design for the tool to be used in such a method.

The closure cap according to the present invention includes a main body having a top and a depending annular side wall. A lower tamper proof element, or security ring, comprises a frangible skirt extending downwardly from the side wall of the closure cap. The frangible skirt is connected to the lower edge of the side wall at a weakened region which is formed at the interface with the side wall. The skirt also includes an inwardly projecting annular bead formed at its lower edge, and at least one external annular shoulder located above the bead. A first inwardly and upwardly tapered surface is provided on the outer surface of the skirt portion immediately below the external shoulder, and a second inwardly and upwardly curved surface is located above the external shoulder. Together with the shoulder, these exterior curved surfaces are used to facilitate removal of the closure cap from the forming mold after a molding operation is completed.

The mold used to form the closure cap of the invention includes an upper cavity mold portion which defines the exterior surface of the cap, and a lower mold portion which fits within the cavity of the upper portion and defines the interior surface of the cap. The interior mold portion includes a support core which carries an annular movable core ring and a center pin, both being movable with respect to the support core. An annular stripper ring is movably mounted with respect to the support core and forms a part of the exterior mold surface in the area of the weakened region of the frangible skirt.

In operation, the top and bottom halves of the mold are closed and the cap material injected into the cavity defined therebetween, in conventional manner. After curing, the mold is opened by separating the upper cavity mold portion from the lower portion, leaving the formed cap on the lower portion of the mold and engaged on its outer surface by the stripper ring. The interior movable ring and the center pin are moved upwardly with respect to the support core, as is the stripper ring to separate the cap from the support core. When the movable core ring reaches its upper limit of motion, the center pin and the stripper ring continue to move upwardly in the same direction and serve to strip the cap from the core ring. The exterior stripper ring engages corresponding shoulders formed on the exterior surface of the cap in the weakened region between the skirt and the cap side wall so that the stripper ring can exert sufficient force to remove the cap from the mold ring. A certain amount of flexing of the lower peripheral bead formed on the skirt portion is required to enable the bead to move over the surface of the core ring. However, this flexing is facilitated by the provision of a plurality of generally vertical grooves formed in the annular bead which allow the skirt to expand radially. The construction of the exterior stripper ring permits such expansion and, at the same time, prevents flexing of the weakened region, whereby the cap can be removed from the mold reliably and without damage.

BRIEF DESCRIPTION OF THE DRAWINGS

The foregoing and additional objects, features and advantages of the present invention will be more fully understood from a consideration of the following detailed description of a preferred embodiment of the invention, taken in conjunction with the accompanying drawings, in which:

FIGS. 2–6 schematically illustrate in cross-section the tool and the closure cap, as well as the sequence of steps for ejecting the closure cap from the tool.

DESCRIPTION OF A PREFERRED EMBODIMENT

Figure 1:
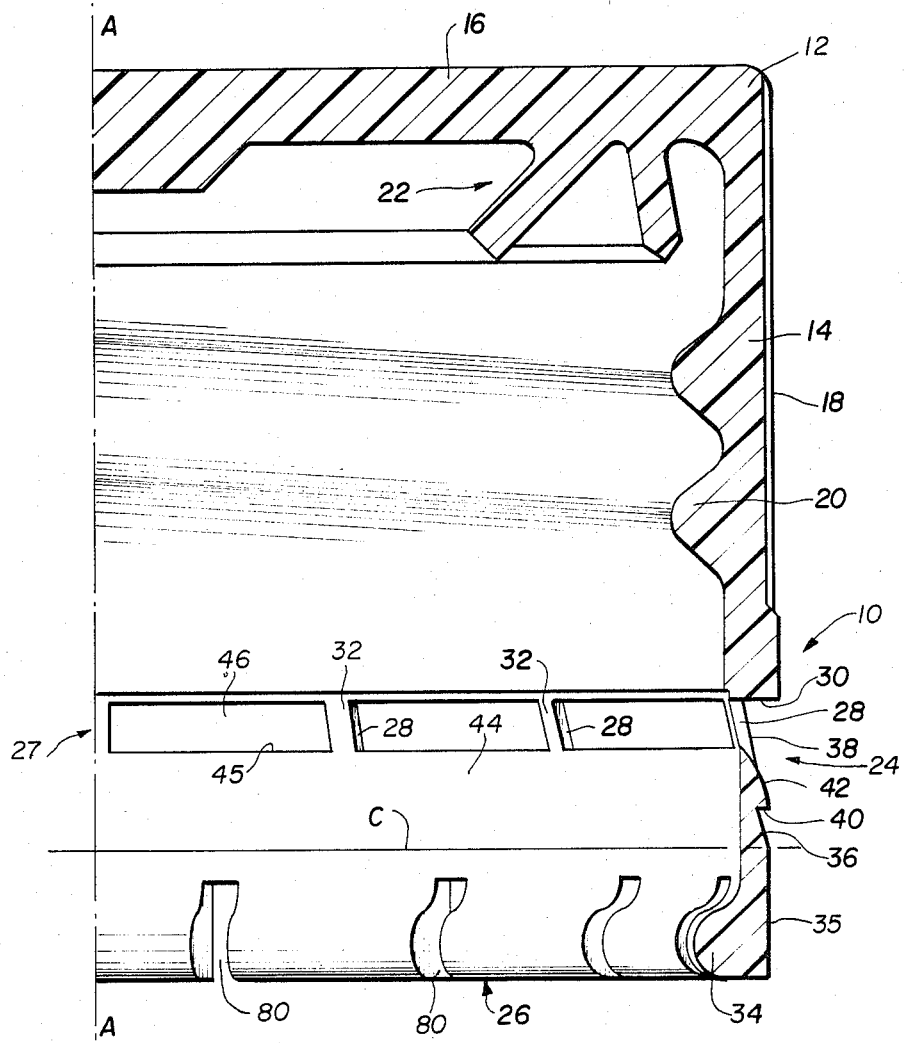
FIG. 1 is a partial view in cross-section of a closure cap which incorporates the tamper proof feature according to the present invention.

Turning now to a more detailed consideration of the present invention, there is illustrated in FIG. 1 a closure cap 10 having a longitudinal axis A—A. The cap includes an outer closure shell 12 comprising an annular side wall 14 and a transverse top 16. The annular side wall 14 may include serrations 18 on its exterior surface and a conventional thread 20 on its interior surface. An annular sealing member 22 is formed as part of the closure member and preferably is similar to that shown in U.S. Pat. No. 4,143,785. Alternatively, the sealing member 22 can be constructed in accordance with the two-shot design shown in U.S. Pat. No. 4,308,965. Connected to and formed as a continuation of the side wall 14 is a tamper proof skirt 24 which is formed unitarily with the cap, but which is separable therefrom. The tamper proof skirt 24 comprises an annular security ring portion 26 having a weakened region generally indicated at 27, the weakened region being provided by, and thus defined by a series of spaced connection ribs 28, each of which extends between the ring portion 26 and the annular wall 14. The ribs 28 each taper upwardly and inwardly toward the inner peripheral edge of a lower surface 30 forming the bottom of sidewall 14. The surface 30 is generally perpendicular to the axis A—A of the cap and defines a first transverse shoulder for the cap. Each rib is tapered to define a narrowed region 32 at its connection, or interface, with the surface 30, which region on each of the ribs is designed to fracture when the cap is removed from a container on which it has been placed, thereby leaving the ring 26 on the container as evidence of tampering.

The ring portion 26 includes a bead 34 formed on its lower edge and extending inwardly. This bead is adapted to engage the lower edge of a corresponding bead formed on the exterior finish of the container to which the cap is to be applied. The bead 34 inhibits removal of the ring portion 26 from the container, thereby causing the fracturing of the ribs 28.

The outer surface of the ring portion 26 is shaped to facilitate removal of the ring from the shaping tool, or mold, which is used in the manufacture of the cap. Accordingly, the ring is defined by a lower surface 35 which is essentially concentric with the axis A—A and which extends from the bottom of skirt 26 to a location above the bead 34 and identified by the plane C illustrated in FIG. 1. From this location, the exterior surface indicated at 36 tapers inwardly and upwardly, preferably at an angle of approximately 10° from the vertical. It should be noted that the exterior surfaces of the ribs 28, which were previously said to be tapered inwardly, also are tapered at approximately 10° from the vertical as indicated at 38.

The inwardly sloping surface 36 terminates at a transversely extending annular shoulder 40 which lies about midway between the plane C and the top edge of the skirt portion 26. Extending upwardly from the outer periphery of the shoulder 40 is the surface portion 42 which is arcuate and which extends upwardly and inwardly to intersect the inner vertical surface 44 of the ring portion 26. Surfaces 42 and 44 intersect to define the top edge 45 of the security ring portion 26 at which location the ribs 28 join the ring 26. The lower edge 45, the spaced ribs 28, and the bottom surface 30 define a plurality of apertures 46 which extend around the circumference of the cap and which define the weakened region. Preferably, the arcuate surface 42 has a radius of about 0.125" for a typical cap structure, but this may vary with different sizes of caps.

The significance of these exterior surfaces of the ring portion will become more apparent from the following discussion the molding tool used to form the cap.

A tool or mold for making the cap 10 is illustrated in FIGS. 2–6 as including top and bottom halves 47 and 47' which cooperate to define a mold cavity in which the cap is formed. The top half of the mold 47 includes an upper cavity mold portion 48 which defines the exterior configuration of a cap cavity 49. The interior portion of the cavity 49 is defined by the lower half 47' of the mold which includes a lower support core 50, an annular movable core ring 52 coaxial with and mounted for limited motion along support core 50, and an axial center pin 54 movable within support core 50. An exterior annular stripper ring is mounted for axial motion outside and with respect to the support core 50, with the interior surface of the stripper ring including a mold portion 57 which cooperates with the top half 47 of the mold to define a portion of the exterior surface of the cap 10. More particularly, the mold portion 57 of the stripper ring defines the transverse shoulder portions 30 and 40 as well as the tapered surfaces 36 and 42, the ribs 28, and the apertures 46 during the molding operation. Thus, the molding region 57 of the stripper ring 56 shapes and defines the weakened region of the tamper proof ring.

The core 50 includes an upper surface 60 which defines and forms the inner surface of the top of cap 10, and further includes a lower annular support shoulder 62 which receives the bottom edge of the core ring 52 to position that ring during the molding operation so that its top is flush with the top of core 50. Accordingly, the top of the core ring 52 defines a part of the interior surface of the top of cap 10, including that part which includes the sealing portion 22. The core ring 52 also defines on its outer peripheral surface the shape of the interior surface of wall 14 of the cap as well as the interior surface of the depending skirt 24. Thus, the core ring 52 may include suitable grooves 64 for forming the sealing ring 22, grooves 66 for forming the thread 20, and a groove 68 for forming the bead 34.

Figure 3:
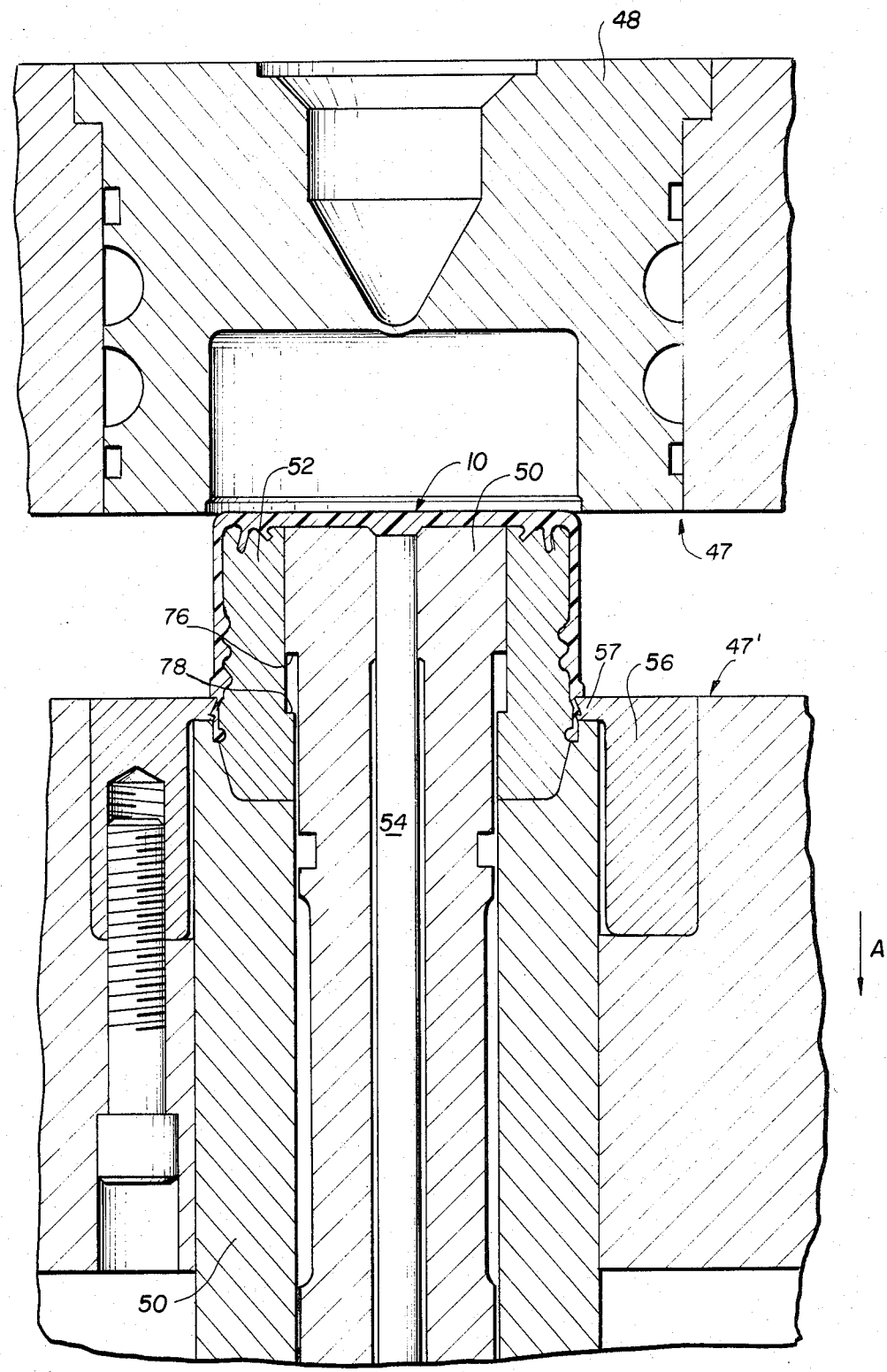

The unique cooperation between the stripper ring 56 and the remainder of the mold for releasing the cap 10 without damaging the tamper proof skirt 24 is illustrated in FIGS. 3–6. FIG. 2 shows mold portions 47 and 47′ in the closed position, subsequent the formation of the closure cap 10 by conventional injection of a suitable plastic material from an injection device (not shown) through an injection cavity 70 formed in the upper portion 47 of the mold, and through a port 72 into cavity 49. After the cap is formed, the mold is opened by separating the upper and lower portions 47 and 47′, as by moving the elements 50, 52, 54 and 56, together with cap 10, downwardly in the direction of arrow A (FIG. 3) and away from the upper mold portion 47. This withdraws the closure cap 10 from the cavity 49, the cap being held secure on the downwardly moving element, as shown in FIG. 3. The downward movement continues until a sufficient clearance is achieved relative to the upper cavity mold 48 to permit removal of the closure cap 10 from the lower mold elements in the manner to be described.

Once a sufficient clearance is achieved, the cap is stripped from the lower mold portion 47′ by moving the stripper ring 56 and the center pin 54 upwardly with respect to the support core 50 in the direction indicated by the arrows B in FIG. 4. This motion carries the cap and the annular core ring 52 upwardly on the support core 50. As illustrated in FIG. 4, the support core 50 includes a central support post which surrounds and guides the center pin 54 and which includes an enlarged heed portion 74 which defines a lower transversely extending shoulder 76. The movable core ring 52 slideably engages the enlarged portion 74 and includes at its lower end an inwardly extending shoulder portion 78 which extends inwardly below the enlarged portion of the support core 50 so that the opposed shoulders 76 and 78 act as a motion-limiting stop for the core ring 52. Thus, the upward motion of the stripper ring 56 and the center pin 54 carries the core ring 52 upwardly until the shoulder 78 engages the opposed shoulder 76 to stop the upward motion of the core ring. At this time, the security ring portion 26 of the skirt 24 has moved upwardly with respect to the core 50 sufficiently far to be free of the core.

After the core ring 52 stops, the center pin 54 and the stripper ring 56 continue to move upwardly with respect to the center core 50 and with respect to the now-stopped core ring 52. This continued motion of the stripper ring and the center pin removes the finished cap 10 from the movable core rib. The engagement of the stripper ring with the shoulders 30 and 40 formed on the exterior of the cap enables the stripper ring to force the cap upwardly to disengage the threads 20 from the corresponding grooves 56 and to disengage the bead 34 from its corresponding groove 68 in the core ring 52. Ordinarily, such a removal operation would be expected to cause serious damage to the security ring, for the narrow ribs in the weakened region between the cap side wall and the security ring will often fracture during such a removal operation, resulting in an unacceptable level of rejects. However, the stripper ring of the present invention engages not only the bottom of the cap by means of shoulder 30, but also engages the security ring by means of shoulder 40, so that the upward motion of the stripper ring not only forces the cap up and off of the core ring 52, but also applies and upward force to the security ring portion 26, thereby preventing longitudinal stress in the ribs 28. Furthermore, the engagement of the stripper ring 56 with the exterior surfaces of the skirt 24 above the region of the bead 34 permits the bead to flex outwardly (in a direction indicated by the arrow D in FIG. 4) sufficiently to clear the core ring 52 while at the same time preventing the weakened portion of the skirt 24 above the surface area 36 from flexing outwardly and being stressed. The molding region 57 of the stripper ring 56 engages the surfaces 36 and 42 as well as the shoulder 40, the ribs 28 and the shoulder 30 to prevent these areas, which are reduced in thickness and therefore comprise the weakened region of the skirt from flexing outwardly during the cap stripping. Thus, the pivot point for the lower bead portion of the security ring is effectively shifted down from the area of the ribs 28 to the area of the plane C (FIG. 1).

Movement of the bead 34 out of its corresponding groove 68 during the stripping operation is facilitated by the provision of a plurality of vertically extending slots 80. These slots allow the bead to expand in a radial direction and thus to more easily pass over the core ring 52. These slots serve, in addition, to facilitate the application of the closure to a container, enabling the security ring to expand radially during application of the container as the bead 34 passes over a corresponding bead on the container finish.

Once the cap 10 has been moved upwardly by the stripper ring 56 and by the center pin 54 in the manner described above, the stripper ring 56 is stopped and the cap 10 is separated therefrom by further upward movement of the center pin 56 in the direction indicated by the arrow E in FIG. 6. Only a slight flexing of the skirt 24 inwardly, in the direction of the arrows F in FIG. 5, is needed for this purpose, and this movement is facilitated by the taper of the surfaces 36 and 38 and the curvature of the surface 42.

Figure 7:
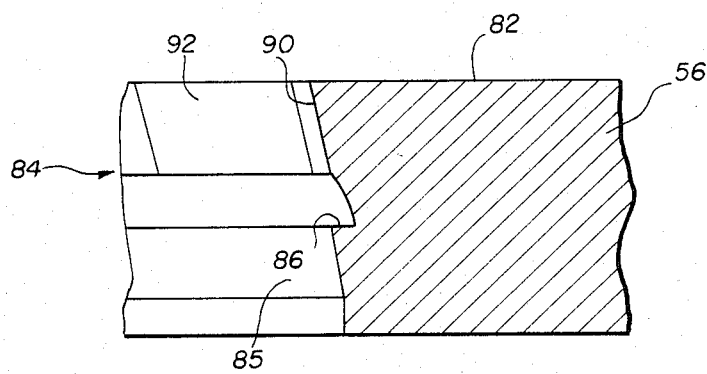
FIG. 7 is a partial enlarge cross-sectional view of the stripper ring illustrated in FIGS. 2–6.

The unique stripper ring 56 and the corresponding mating surfaces on the cap 10 cooperate to consistently produce a cap with its tamper proof skirt portion intact, thereby eliminated the loss of cap production due to damage caused during removal from the forming mold. As illustrated in FIG. 7, the stripper ring 56 includes a top surface 82 which is adapted to engage and to form the surface 30 of the cap side wall 14. In addition, the stripper ring includes an interior surface 84 which is shaped to form and thus to engage the surfaces 36, 40, 42, and 38 of the skirt 24. Thus, the stripper ring includes mating surfaces 85, 86, 88 and 90, respectively. In addition, the inner surface of the stripper ring carries a plurality of blocks 92 which extend inwardly to engage the exterior surface of the movable core ring 52 when the mold is in its closed position so as to form the apertures 46 between the ribs 28, illustrated in FIG. 1.

Thus there has been described a new and unique closure cap for containers as well as a novel mold arrangement and method for stripping the cap therefrom. Although the invention has been described in terms of a preferred embodiment, it will be apparent that various modifications may be made without departing from the true spirit and scope thereof as set forth in the following claims.

What is claimed is:

1. A unitary, molded closure cap capable of being applied to a container to provide tamper-proof security without heat shrinking, comprising a substantially rigid outer closure member having a transverse top wall and a cylindrical side wall, integrally formed at its upper end with the perimeter of said transverse top wall and depending therefrom, the lower end of said side wall defining an open end of said outer closure member, said closure member being adapted to receive the mouth and neck of a container, said side wall having a first outer diameter;

a resilient inner sealing member secured to the inner surface of said transverse top wall and adapted to engage and seal the mouth of a container;

an annular skirt portion connected to the lower end of said side wall to form an extension of said side wall and having an outer surface with a diameter no greater than said first outer diameter, said skirt portion, including;

(a) a lower security ring portion and an upper rib portion connecting said security ring to the lower edge of said side wall, said security ring protion having an outer surface having a diameter substantially equal to said first diameter;

(b) an inwardly facing annular bead formed at the lower end of said security ring portion;

(c) a first inwardly and upwardly tapering portion formed on the outer surface of said security ring portion defining a downwardly facing first annular shoulder extending diametrically inwardly from said outer surface of said security ring portion above said annular bead and below said upper rib portion;

(d) a curved exterior surface portion formed on the outer surface of said security ring extending upwardly and inwardly from said first annular shoulder to the inner surface of said security ring portion at its junction with said upper rib portion to define an upper edge for said security ring portion, said upper edge being spaced below said lower end of said side wall;

(e) said upper rib portion comprising a plurality of spaced inwardly tapered ribs extending between said upper edge of said security ring portion and the inner peripheral edge of said lower end of said side wall; and wherein said lower edge of said side wall comprises a second annular shoulder extending diametrically inwardly from the outer surface if said closure member, said first and second annular shoulders serving as spaced mold engaging surfaces to protect said ribs during removal of a completed molded closure cap from a forming mold.

2. The closure cap of claim 1, wherein said ribs define an inwardly tapered exterior surface of said upper rib portion of said skirt.

3. The closure cap of claim 1, further including at least one expansion groove formed in said bead.

* * * * *